United States Patent
Nakahama et al.

(10) Patent No.: US 12,100,823 B2
(45) Date of Patent: Sep. 24, 2024

(54) COOLING SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takafumi Nakahama, Fuchu Tokyo (JP); Kenji Mitsumoto, Kawasaki Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 489 days.

(21) Appl. No.: 17/628,203

(22) PCT Filed: Aug. 9, 2019

(86) PCT No.: PCT/JP2019/031582
§ 371 (c)(1),
(2) Date: Jan. 18, 2022

(87) PCT Pub. No.: WO2021/028962
PCT Pub. Date: Feb. 18, 2021

(65) Prior Publication Data
US 2022/0263157 A1 Aug. 18, 2022

(51) Int. Cl.
*H01M 10/6556* (2014.01)
*H01M 10/613* (2014.01)
*H01M 10/6563* (2014.01)

(52) U.S. Cl.
CPC ..... *H01M 10/6556* (2015.04); *H01M 10/613* (2015.04); *H01M 10/6563* (2015.04)

(58) Field of Classification Search
CPC .......... H01M 10/613; H01M 10/6556; H01M 10/6563
See application file for complete search history.

(56) References Cited

U.S. PATENT DOCUMENTS

2018/0191043 A1* 7/2018 Nelson ................ H01M 10/613

FOREIGN PATENT DOCUMENTS

| JP | 2012-084486 A | 4/2012 |
| JP | 2015-109153 | * 6/2015 |

(Continued)

OTHER PUBLICATIONS

English translation of JP Publication 2016-091951, May 2016.*
English translation of JP Publication 2015-109153, Jun. 2015.*

*Primary Examiner* — Brittany L Raymond
(74) *Attorney, Agent, or Firm* — Finnegan, Henderson, Farabow, Garrett & Dunner, LLP (57) ABSTRACT

A cooling system of an embodiment includes a container, a housing, and a duct. The container includes an inflow passage extending in a first direction, an outflow passage positioned in a second direction, the outflow passage extending in the first direction, an inflow port through which cooling air from an air conditioning device flows in, and an outflow port through which the cooling air flows out. The housing includes shelf portions arranged between the inflow passage and the outflow passage, the shelf portions containing heat-generating modules. The housing includes intermediary passages extending between the inflow passage and the outflow passage across the shelf portions. The duct connects the inflow port and an outlet port of the air conditioning device. The duct includes a sloping face facing the cooling air and sloping in the second direction as the sloping face approaches the inflow port.

14 Claims, 11 Drawing Sheets

(56) References Cited

FOREIGN PATENT DOCUMENTS

| JP | 2015-122166 A | | 7/2015 |
|----|---------------|---|--------|
| JP | 2016-091951 | * | 5/2016 |

* cited by examiner

COOLING SYSTEM

CROSS-REFERENCE TO RELATED APPLICATIONS

This application is a national stage application of International Application No. PCT/JP2019/031582, filed Aug. 9, 2019, which designates the United States, the entire contents of which are incorporated herein by reference.

FIELD

An embodiment described herein relates to a cooling system.

BACKGROUND

Conventionally, a known cooling system includes a container and a housing. The container is provided with an inflow passage and an outflow passage both extending in a first direction, an inflow port being interconnected with the inflow passage and through which cooling air from an air conditioning device flows in, and an outflow port being interconnected with the outflow passage and through which cooling air flows out. The housing includes shelfs being arranged between the inflow passage and the outflow passage and containing heat-generating modules. The housing is provided with intermediary passages extending between the inflow passage and the outflow passage in the shelfs.

DETAILED DESCRIPTION

A cooling system of an embodiment includes, for example, a container, a housing, and a duct. The container includes an inflow passage extending in a first direction, an outflow passage positioned in a second direction intersecting the first direction of the inflow passage, the outflow passage extending in the first direction, an inflow port through which cooling air from an air conditioning device flows in, the inflow port being interconnected with the inflow passage, and an outflow port through which the cooling air flows out, the outflow port being interconnected with the outflow passage. The housing includes shelf portions arranged between the inflow passage and the outflow passage, the shelf portions containing heat-generating modules, the housing including intermediary passages extending between the inflow passage and the outflow passage across the shelf portions. The duct connects the inflow port and an outlet port of the air conditioning device, the duct including a sloping face facing the cooling air and sloping in the second direction as the sloping face approaches the inflow port from the air conditioning device.

The following discloses an exemplary embodiment and modifications thereof according to the present invention. The configurations of the embodiment and the modifications described below, as well as operations and advantages produced by those configurations, are merely examples. The present embodiment can be implemented by the use of configurations other than those disclosed by the following embodiments and modifications. According to the present embodiment, at least one of the various advantages (including secondary advantages) produced by each configuration can be obtained.

Moreover, each of the embodiment and modifications disclosed below includes the same constituent elements as those included in the others. Thus, in the following description, duplicated descriptions are omitted while the same reference signs are attached to these same constituent elements. In the present specification, ordinal numbers are used to differentiate components, members, areas, positions, directions, and the like and are not intended to specify an order or priority.

Embodiment

Figure 1:
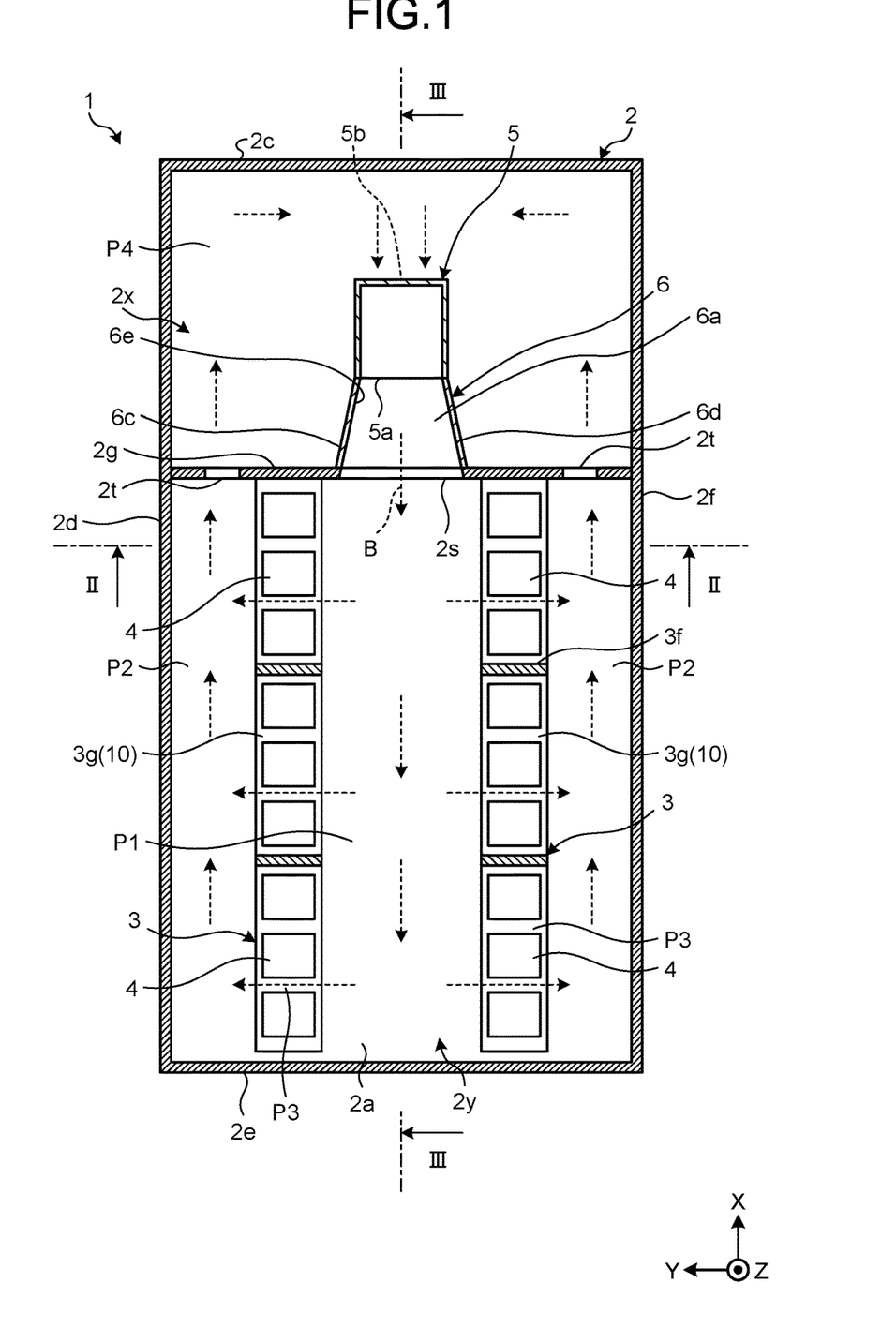
FIG. 1 is an exemplary and schematic sectional view of a storage battery system to which a cooling system according to an embodiment is applied, and is a sectional view taken along the I-I line in FIG. 2.
Figure 2:
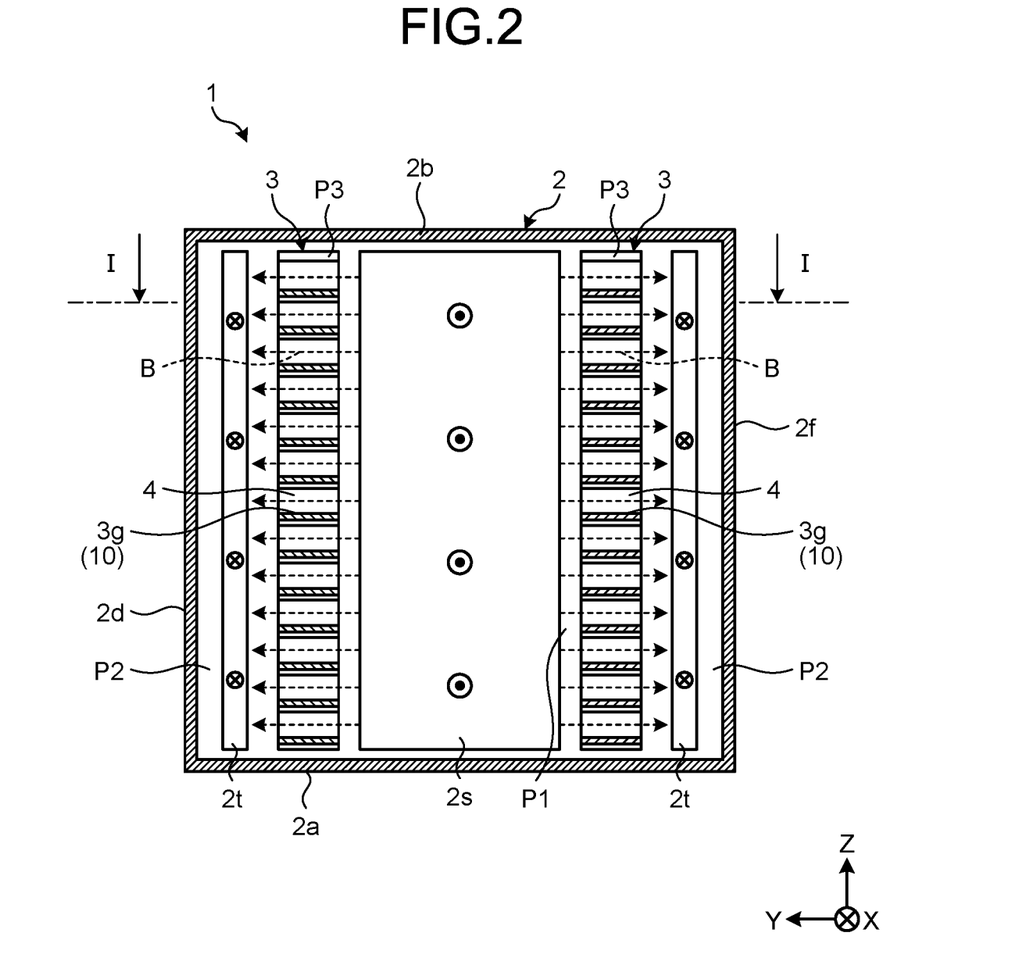
FIG. 2 is a sectional view taken along the II-II line in FIG. 1.

FIG. 1 is a sectional view of a storage battery system 1 to which a cooling system according to an embodiment is applied, and is a sectional view taken along the I-I line in FIG. 2. As illustrated in FIG. 1, the storage battery system 1 includes, for example, a container 2, housings 3, battery modules 4, an air conditioning device 5, and a duct 6. The battery modules 4 are contained on corresponding shelf portions 10 of the housings 3 at distances from one another. The battery module 4 is an example of a module.

In the present embodiment, respective output terminal parts of the battery modules 4 are connected in series or in parallel, whereby the storage battery system 1 is formed as a containerized system. This containerized storage battery system 1 can be used, for example, as a power supply for an outdoor facility or the like or as an emergency power supply. It is noted that the cooling system is not limited to this example and may be applied to, for example, what is called a containerized data center in which multiple computers as modules are housed in the corresponding shelf portions 10.

In the following description, three directions perpendicular to each other are defined for the sake of convenience. The X direction extends in the frontward and rearward directions (directions along the longer side) of the container 2, the Y direction extends along the leftward and rightward directions (directions along the width or directions along the shorter side) of the container 2, and the Z direction extends in the directions along the height direction (upward and downward directions) of the container 2. The X direction is an example of a first direction, and the Y direction is an example of a second direction.

In the following description, for the sake of convenience, the orientation in the X direction may be simply referred to as frontward, the orientation in the direction opposite to the X direction may be simply referred to as rearward, the orientation in the Y direction may be simply referred to as leftward, the orientation in the direction opposite to the Y direction may be simply referred to as rightward, the orientation in the Z direction may be simply referred to as upward, and the orientation in the direction opposite to the Z direction may be simply referred to as downward.

FIG. 2 is a sectional view taken along the II-II line in FIG. 1. As illustrated in FIGS. 1 and 2, the container 2 is formed in, for example, a rectangular parallelepiped box-like shape that is elongated in the X direction. The container 2 includes a plurality of wall parts such as a bottom wall 2a, a top wall 2b, a front wall 2c, a left wall 2d, a rear wall 2e, a right wall 2f, and a partitioning wall 2g. While the bottom wall 2a may be referred to also as a lower wall, the top wall 2b may be referred to as an upper wall. The front wall 2c, the left wall 2d, the rear wall 2e, the right wall 2f, and the partitioning wall 2g are each referred to as a side wall, a circumferential wall, or the like.

The bottom wall 2a and the top wall 2b both extend in the directions perpendicular to the Z direction (that is, extend on the XY plane), and are provided in parallel with and at a distance from each other in the Z direction. While the bottom wall 2a constitutes a lower end portion of the container 2, the top wall 2b constitutes an upper end portion of the container 2.

The front wall 2c and the rear wall 2e both extend in the directions perpendicular to the X direction (that is, extend on the YZ plane), and are provided in parallel with and at a distance from each other in the X direction. The front wall 2c extends between end portions in the X direction of the bottom wall 2a and the top wall 2b. The rear wall 2e extends between end portions in the opposite direction to the X direction of the bottom wall 2a and the top wall 2b. While the front wall 2c constitutes a front end portion of the container 2, the rear wall 2e constitutes a rear end portion of the container 2.

The left wall 2d and the right wall 2f both extend in the directions perpendicular to the Y direction (that is, extend on the XZ plane), and are provided in parallel with and at a distance from each other in the Y direction. The left wall 2d extends between respective end portions in the Y direction of the bottom wall 2a and the top wall 2b. The right wall 2f extends between respective end portions in the opposite direction to the Y direction of the bottom wall 2a and the top wall 2b. While the left wall 2d constitutes a left end portion of the container 2, the right wall 2f constitutes a right end portion of the container 2.

The partitioning wall 2g is positioned between the front wall 2c and the rear wall 2e and extends between the left wall 2d and the right wall 2f. The partitioning wall 2g is parallel with the front wall 2c and the rear wall 2e. The partitioning wall 2g partitions the interior of the container 2 in the X direction into an air conditioning room 2x and an electrical room 2y that serve as pieces of space. While the air conditioning room 2x is positioned facing the frontward side of the partitioning wall 2g, the electrical room 2y is positioned facing the rearward side of the partitioning wall 2g.

As illustrated in FIG. 1, in the air conditioning room 2x, the air conditioning device 5, the duct 6 to be described below, a connecting passage P4, and the like are provided. In the electrical room 2y, the housings 3, the battery modules 4, an inflow passage P1, outflow passages P2, intermediary passages P3, and the like are provided. The air conditioning device 5 is not limited to this example and may be provided, for example, outside the container 2.

In the partitioning wall 2g, an inflow port 2s and outflow ports 2t are provided. The inflow port 2s and the outflow ports 2t are through-holes penetrating the partitioning wall 2g in the X direction. While the inflow port 2s is positioned in a middle portion of the partitioning wall 2g in the Y direction, the outflow ports 2t are positioned in two opposite end portions of the partitioning wall 2g in the Y direction.

The inflow port 2s interconnects the duct 6 of the air conditioning room 2x with the inflow passage P1 of the electrical room 2y. In the present embodiment, the air conditioning device 5 and the duct 6 are positioned next to the inflow port 2s in the X direction. The outflow ports 2t interconnect the outflow passages P2 of the electrical room 2y with the connecting passage P4 of the air conditioning room 2x.

The inflow port 2s and the outflow ports 2t (see FIG. 2) are provided substantially from end to end of the partitioning wall 2g in the Z direction. In other words, when viewed in the X direction, the inflow port 2s and the outflow ports 2t extend between the upper end portion and the lower end portion of the housing 3.

The inflow passage P1 (see FIG. 1) is provided, inside the electrical room 2y, between the two housings 3 that are distanced from each other in the Y direction. The inflow passage P1 spreads along the housings 3, that is, in the X direction and the Z direction. Cooling air B that is yet to exchange heat with the battery modules 4 and is still cool flows through the inflow passage P1.

The outflow passages P2 are provided, inside the electrical room 2y, between the left wall 2d and one of the housings 3 and between the right wall 2f and the other housing 3. The outflow passages P2 spread along the left wall 2d and the right wall 2f, that is, in the X direction and the Z direction. The cooling air B after the heat exchange with the battery modules 4 flows through the outflow passages P2.

The respective intermediary passages P3 are provided around the battery modules 4 inside the shelf portions 10 of the housings 3. Each of the intermediary passages P3 extends in the Y direction and between the inflow passage P1 and a corresponding one of the outflow passages P2. In other words, the inflow passage P1 and the outflow passages P2 are positioned to shift in the Y direction from each other.

The connecting passage P4 is provided around the air conditioning device 5 and the duct 6 inside the air conditioning room 2x. The connecting passage P4 extends along the left wall 2d, the right wall 2f, and the front wall 2c. When viewed in the z direction, the connecting passage P4 is formed substantially in a U-shape that is open in the direction opposite to the X direction. The connecting passage P4 connects the outflow ports 2t to an inlet port 5b of the air conditioning device 5.

The air conditioning device 5 is installed in the air conditioning room 2x. The cooling air B discharged from an outlet port 5a of the air conditioning device 5 is supplied to the inflow passage P1 of the electrical room 2y through the duct 6 and the inflow port 2s.

The cooling air B then passes through the intermediary passages P3 while traversing the electrical room 2y in the Y direction and the direction opposite thereto, and is discharged from the outflow ports 2t after being gathered in the outflow passages P2. The cooling air B discharged into the connecting passage P4 is sucked into the inlet port 5b by a fan or the like of the air conditioning device 5 and is supplied to the electrical room 2y again after being cooled by a heat exchanger or the like.

Figure 3:
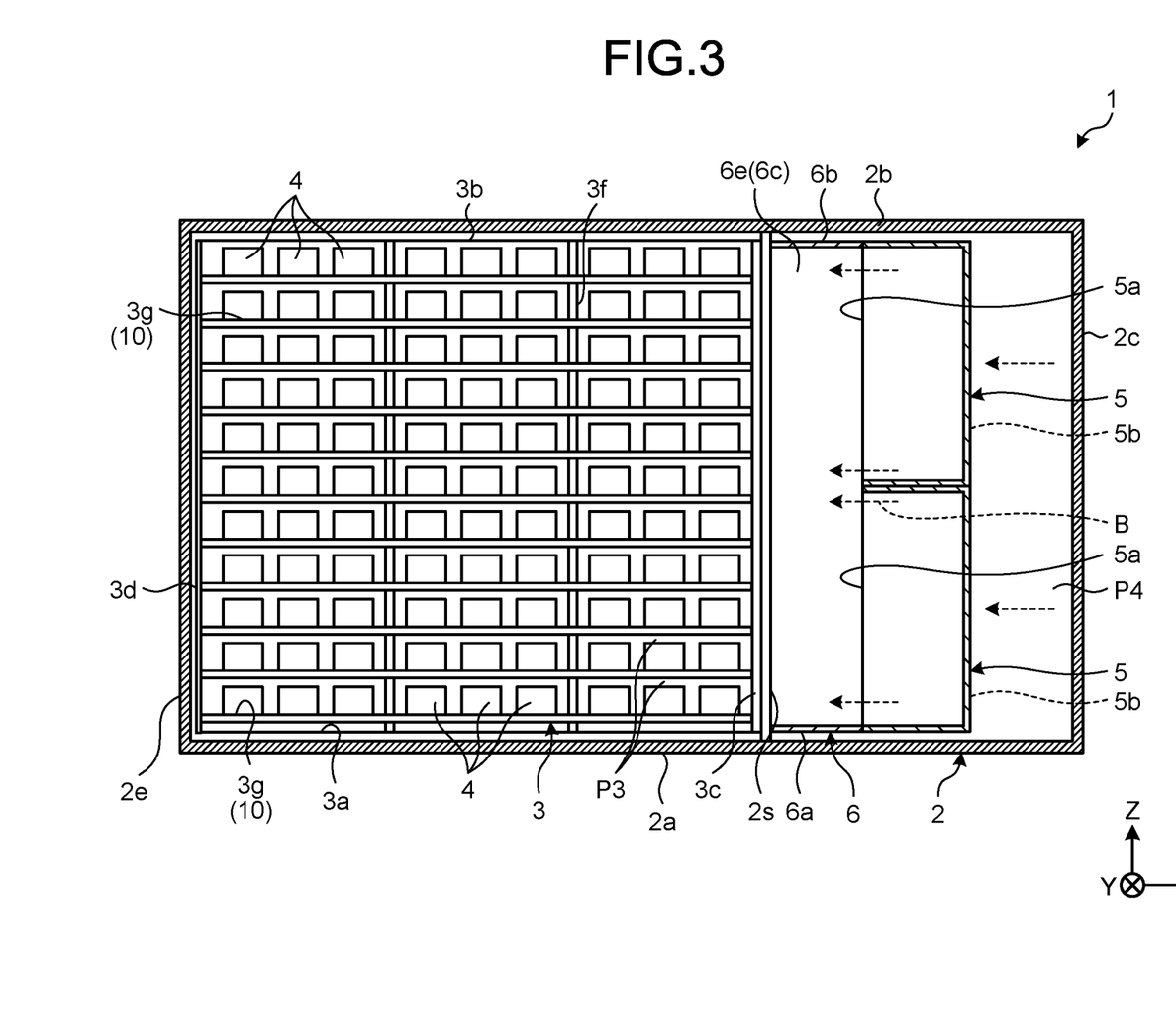
FIG. 3 is a sectional view taken along the line in FIG. 1.

FIG. 3 is a sectional view taken along the line in FIG. 1. As illustrated in FIG. 3, the housing 3 includes multiple wall parts such as a bottom wall 3a, a top wall 3b, a front wall 3c, a rear wall 3d, shelf walls 3g, and partitioning walls 3f.

The bottom wall 3a and the top wall 3b both extend in the directions perpendicular to the Z direction (that is, extend on the XY plane), and are provided in parallel with and at a distance from each other in the Z direction. While the bottom wall 3a constitutes a lower end portion of the housing 3, the top wall 3b constitutes an upper end portion of the housing 3. The bottom wall 3a is supported by the bottom wall 2a of the container 2.

The front wall 3c and the rear wall 3d both extend in the directions perpendicular to the X direction (that is, extend on the YZ plane), and are provided in parallel with and at a distance from each other in the X direction. The front wall 3c extends between end portions in the X direction of the bottom wall 3a and the top wall 3b. The rear wall 3d extends between end portions in the opposite direction to the X direction of the bottom wall 3a and the top wall 3b.

While the front wall 3c faces the partitioning wall 2g of the container 2, the rear wall 3d faces the rear wall 2e of the container 2. It is preferable that seal members for preventing the cooling air B from being discharged from the inflow passage P1 to the outflow passage P2 without passing through the intermediary passages P3 are provided in the gap between the front wall 3c and the partitioning wall 2g, the gap between the rear wall 3d and the rear wall 2e, and the gap between the top wall 3b and the top wall 2b.

The shelf walls 3g are positioned between the bottom wall 3a and the top wall 3b and extend between the front wall 3c and the rear wall 3d. In the housing 3, the shelf walls 3g are provided in parallel with and at distances from each other in the Z direction. The shelf walls 3g are parallel with the bottom wall 3a and the top wall 3b. The shelf walls 3g partition the shelf portion 10 inside the housing 3 into pieces of space (or housing compartments) in the Z direction.

The partitioning walls 3f are positioned between the front wall 3c and the rear wall 3d and extend between the bottom wall 3a and the top wall 3b. In the housing 3, the partitioning walls 3f are provided in parallel with and at distances from one another in the X direction. The partitioning walls 3f are parallel with the front wall 3c and the rear wall 3d. The partitioning walls 3f partition the shelf portion 10 into pieces of space (or housing compartments) in the Y direction. In each of the shelf portions 10, for example, sets of three of the battery modules 4 are housed while being arranged side by side in the X direction.

The housing 3 is not limited to this example, and may include, for example, wall parts provided on both sides of the housing 3 in the Y direction and opening portions are provided on the wall parts such that opening portions can be interconnected with the shelf portion 10. In this case, it is preferable that the opening portion be covered by a covering member such as a mesh or a filter.

The housing 3 may be formed by separable parts that are separable in the X direction. In this case, the partitioning wall 3f may be formed by, for example, an overlap between the front wall 3c and the rear wall 3d of the two separable parts. The housing 3 is also referred to as a rack housing, a battery rack, or the like.

The battery module 4 includes, for example, a module housing, multiple battery cells housed inside the module housing, an output terminal part that is electrically connected to electrode parts of the battery cells via an electroconductive member such as a bus bar, and the like. The battery module 4 is referred to also as a battery unit, a battery pack, or the like.

The battery cell is configured of, for example, a lithium-ion secondary battery. The battery cell may be another secondary battery such as a nickel hydrogen battery or a nickel-cadmium battery. The battery cell is referred to also as a primary cell.

Figure 4:
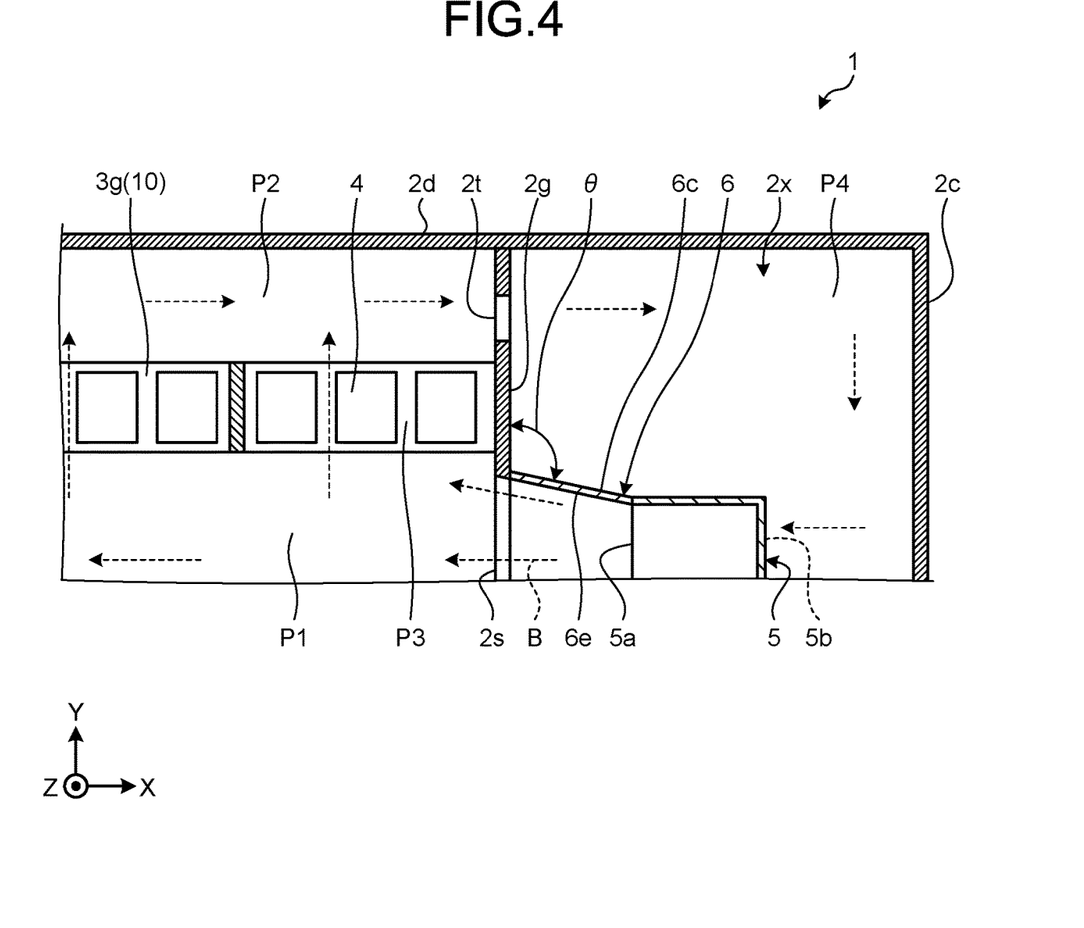
FIG. 4 is an enlarged view of a part of FIG. 1.

FIG. 4 illustrates a part of the duct 6 in FIG. 1. As illustrated in FIG. 4, the duct 6 connects the outlet port 5a of the air conditioning device 5 and the inflow port 2s of the container 2. The duct 6 includes, for example, a bottom wall 6a, a top wall 6b (see FIG. 3), a pair of side walls 6c and 6d (see FIGS. 1 and 4) and is formed as a whole in a rectangular tubular shape that extends along the X direction.

The bottom wall 6a and the top wall 6b both extend in the directions perpendicular to the Z direction (that is, extend on the XY plane), and are provided in parallel with and at a distance from each other in the Z direction. The bottom wall 6a constitutes a lower end portion of the duct 6, and the top wall 6b constitutes an upper end portion of the duct 6. While the bottom wall 6a faces the bottom wall 2a of the container 2, the top wall 6b faces the top wall 2b of the container 2.

The pair of side walls 6c and 6d extends in the directions perpendicular to the Y direction (that is, extends on the XZ plane). The side walls 6c and 6d are provided at a distance from each other in the Y direction. The side wall 6c extends between end portions in the Y direction of the bottom wall 6a and the top wall 6b. The side wall 6d extends between end portions in the opposite direction to the Y direction of the bottom wall 6a and the top wall 6b. While the side wall 6c constitutes a left end portion of the duct 6, the side wall 6d constitutes a right end portion of the duct 6.

Additionally, in the present embodiment, the pair of side walls 6c and 6d slope to widen in both sides of the Y direction as they approach the inflow port 2s from the air conditioning device 5. In other words, while the side wall 6c slopes in the Y direction as it approaches the inflow port 2s, the side wall 6d slopes in the direction opposite to the Y direction as it approaches the inflow port 2s.

The pair of side walls 6c and 6d include respective sloping faces 6e, each facing the cooling air B. The sloping face 6e is referred to as an inner surface, a guide surface, a tapered surface, or the like. The sloping face 6e serves to supply, at a given angle, the inflow passage P1 and also the intermediary passages P3 with the cooling air B discharged from the air conditioning device 5 into the duct 6.

In the present embodiment, the angle θ between each of the side walls 6c and 6d and the partitioning wall 2g, that is, the angle θ of the sloping face 6e with respect to the partitioning wall 2g is more than 90° and less than 180°.

That is, the angle θ satisfies 90°<θ<180°.

Note that, more preferably, the angle θ is set to 105° or smaller because the cooling air B is more likely to separate from the sloping faces 6e when the angle θ is larger than 120°.

That is, the angle θ satisfies 90°<θ<105°.

If assuming that the inner surfaces of the side walls 6c and 6d of the duct 6 are horizontal surfaces extending along the X direction or are sloping faces sloping toward the center in the Y direction to narrow as they approach the inflow port 2s from the air conditioning device 5, the cooling air B is more likely to stagnate in the inflow passage P1 more in regions surrounding the battery modules 4 of the inflow port 2s side than in regions opposite to the inflow port 2s, that is, regions of the rear wall 2e side.

As a result of this stagnation, flow velocity of the cooling air B that flows in the intermediary passage P3 of the inflow port 2s side are lower than flow velocity of the cooling air B that flows in the intermediary passages P3 of the rear wall 2e side, whereby cooling performance on the battery modules 4 of the inflow port 2s side is likely to be reduced consequently.

In this point, according to the present embodiment, part of the cooling air B can be guided by the side walls 6c and 6d of the duct 6 toward each region around the battery modules 4 of the inflow port 2s side. Therefore, the flow velocity of the cooling air B, which flows through the intermediary passages P3 of the inflow port 2s side, are prevented from lowering than the flow velocity of the cooling air B that flows through the intermediary passages P3 of the rear wall 2e side.

Therefore, for example, variation in cooling performance of the cooling air B on the battery modules 4 are easily reduced. Consequently, location-dependent differences in temperature among the battery modules 4 are easily reduced.

In the present embodiment, the sloping faces 6e corresponding to the two outflow passage P2 are provided on both sides in the Y direction of the duct 6. However, the embodiment is not limited to this example, and, for example, the outflow passage P2 and the sloping face 6e may each be provided on one side in the Y direction.

In addition, only the inner surfaces of the side walls 6c and 6d of the duct 6 may slope while the outer surfaces thereof may be horizontal surfaces extending in the X direction. The perimeter of the inflow port 2s may be left without sloping along the sloping faces 6e.

In the present embodiment, the inflow passage P1 and the inflow port 2s, and the outflow passages P2 and the outflow ports 2t, are provided next to each other in the X direction (the horizontal direction). However, the embodiment is not limited to this example, and the inflow passage P1 and the inflow port 2s, and the outflow passages P2 and the outflow ports 2t, may be provided next to each other in the Z direction (the upward and downward direction) as in a conventional case (for example, FIG. 2 of Patent Literature 1).

First Modification

Figure 5:
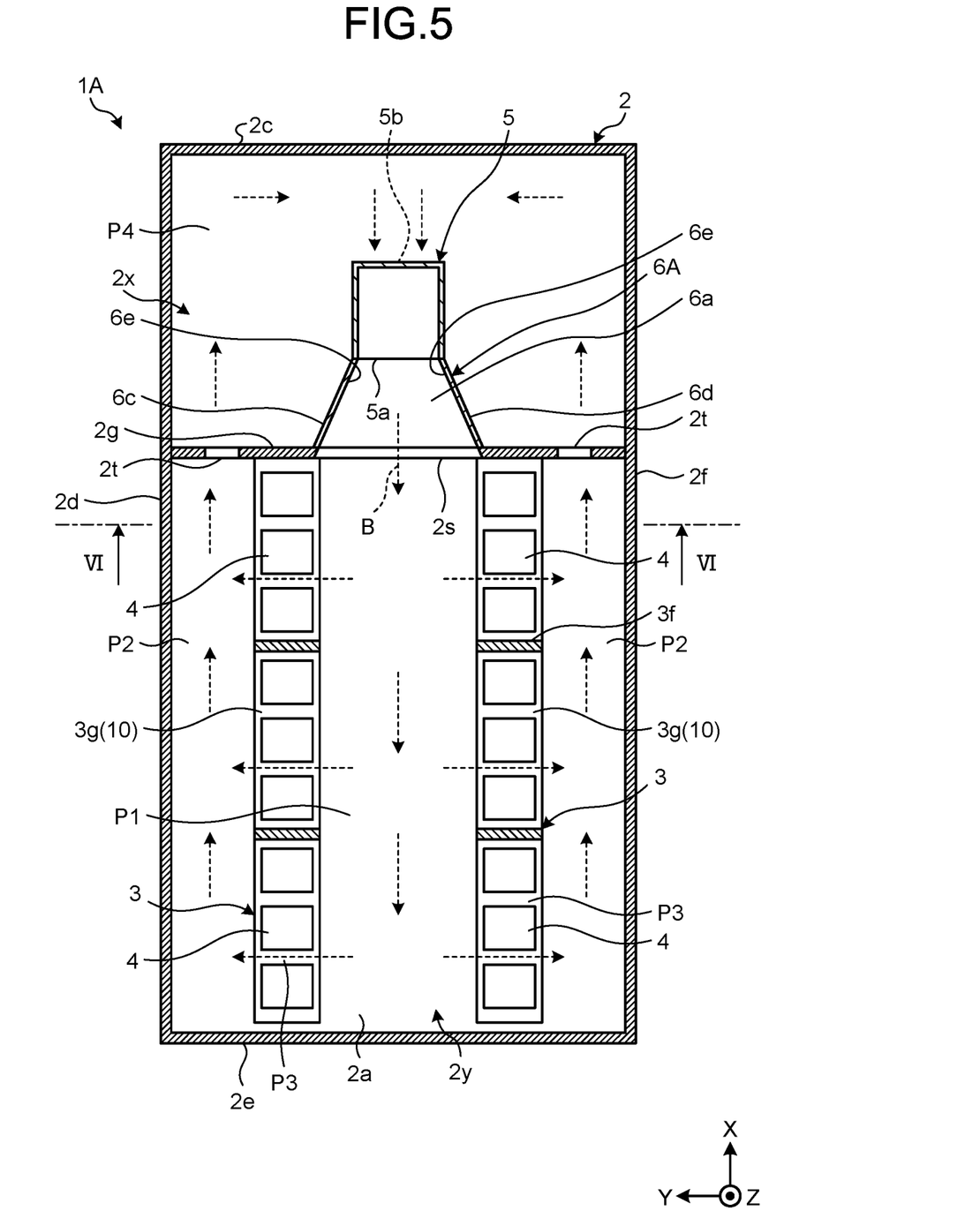
FIG. 5 is an exemplary and schematic sectional view of a storage battery system to which a cooling system according to a first modification is applied, and is a sectional view taken along the V-V line in FIG. 6.
Figure 6:
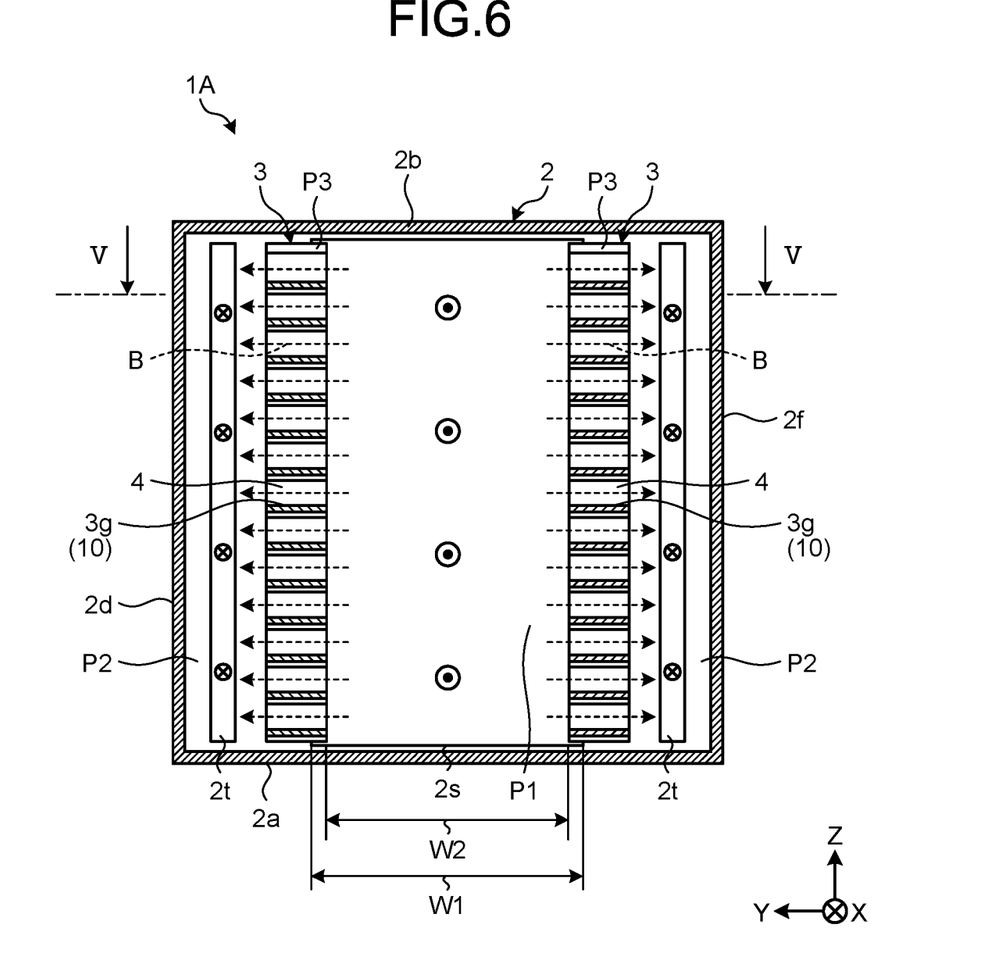
FIG. 6 is a sectional view taken along the VI-VI line in FIG. 5.

FIG. 5 is a sectional view of a storage battery system 1A according to a first modification and is a sectional view taken along the V-V line in FIG. 6. FIG. 6 is a sectional view taken along the VI-VI line in FIG. 5. The storage battery system 1A includes the similar configurations to the storage battery system 1 in the above-described embodiment. Therefore, the storage battery system 1A can produce the similar operation and advantages to the above embodiment based on those similar configurations.

However, the present modification is different from the above embodiment in that, for example, an opening width W1 of the inflow port 2s in the Y direction is larger than a width W2 of the inflow passage P1 in the Y direction as illustrated in FIGS. 5 and 6. In other words, the inflow port 2s has a region not overlapping with the inflow passage P1 in the X direction.

A duct 6A connects the inflow port 2s and the outlet port 5a of the air conditioning device 5. In the present modification, the opening width of the duct 6A along the Y direction at an open end thereof facing the inflow port 2s is larger than the width W2 of the inflow passage P1.

According to the present modification, the opening width W1 of the inflow port 2s is larger than the width W2 of the inflow passage P1, whereby, for example, parts of the cooling air B to the battery modules 4 (the battery module groups) that are the nearest to the inflow port 2s can be supplied by the action of the sloping face 6e. This consequently can enhance cooling performance on the battery modules 4.

Therefore, for example, location-dependent differences in temperature among the battery modules 4 are easily reduced. Consequently, the life-span of the storage battery system 1A can be extended.

Second Modification

Figure 7:
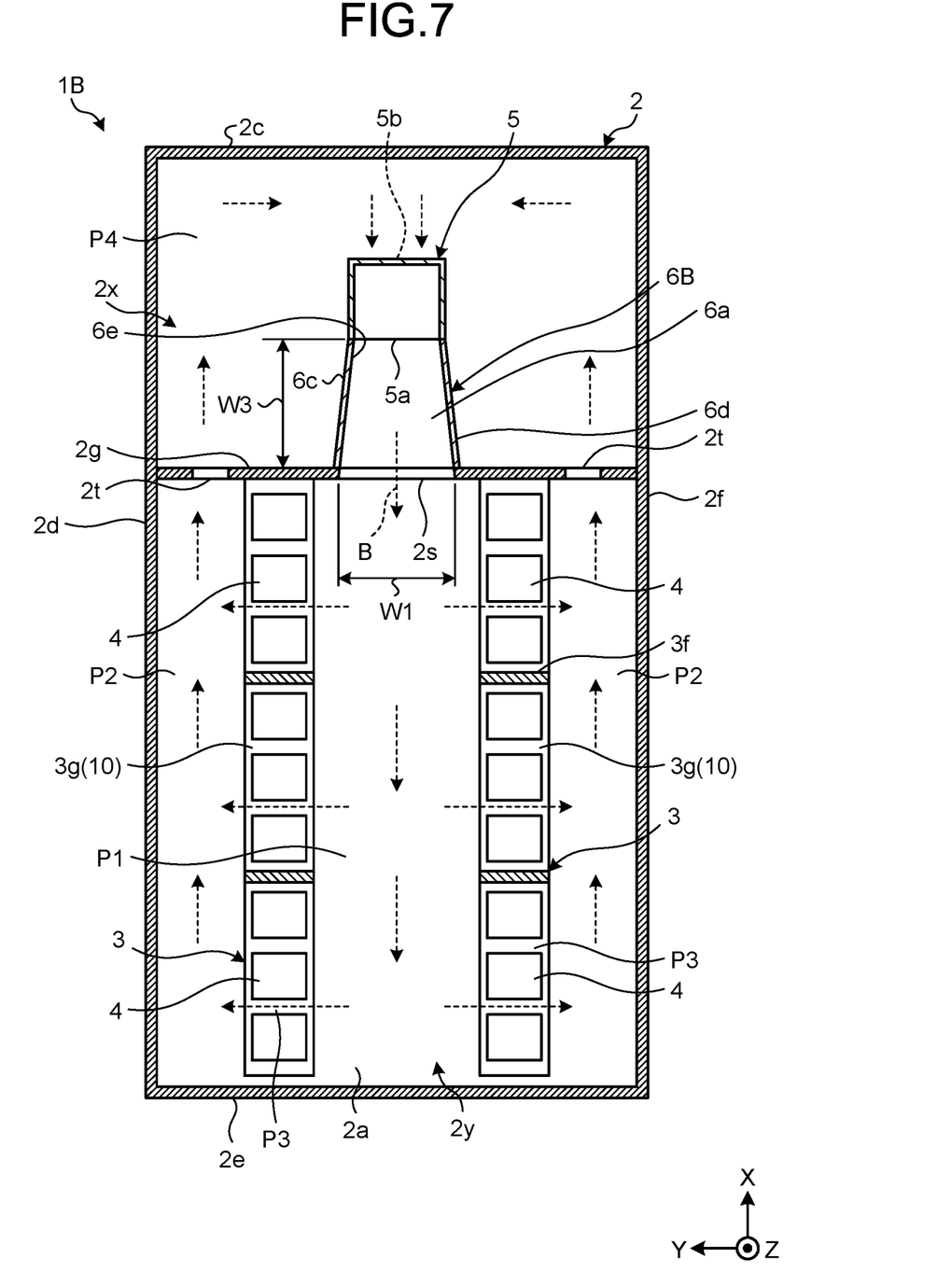
FIG. 7 is an exemplary and schematic sectional view of a storage battery system to which a cooling system according to a second modification is applied.

FIG. 7 is a sectional view of a storage battery system 1B according to a second modification. The storage battery system 1B includes the similar configurations to the storage battery system 1 in the above embodiment. Therefore, the storage battery system 1B can produce the similar operation and advantages to the above embodiment based on those similar configurations.

However, the present modification is different from the above embodiment in that, for example, a depth (length) W3 of a duct 6B in the X direction is larger than the opening width W1 of the inflow port 2s in the Y direction as illustrated in FIG. 7. In other words, the duct 6B includes an extended portion by which the duct 6B is extended in the X direction to be larger than the opening width W1.

The duct 6B connects the inflow port 2s and the outlet port 5a of the air conditioning device 5. In the present modification, the angle θ of each of the sloping faces 6e to the partitioning wall 2g is smaller than in the above embodiment in accordance with a degree to which the dust 6B is extended in the X direction.

Thus, according to the present modification, the depth W3 of the duct 6B is larger than the opening width W1 of the inflow port 2s, whereby, for example, the distribution of flow velocity of the cooling air B that passes through the duct 6B can be easily uniformed.

As a result, the cooling air B that flows near the inflow port 2s in the inflow passage P1 is prevented from increasing in flow velocity. Consequently, the cooling air B can be prevented from stagnating in regions around the battery modules 4 that are relatively near to the inflow port 2s, and the cooling air B can be prevented from flowing backward from the outflow passage P2 to the inflow passage P1.

Therefore, for example, variations in cooling performance of the cooling air B on the battery modules 4 are easily reduced. Consequently, location-dependent differences in temperature among the battery modules 4 are easily reduced.

Third Modification

Figure 8:
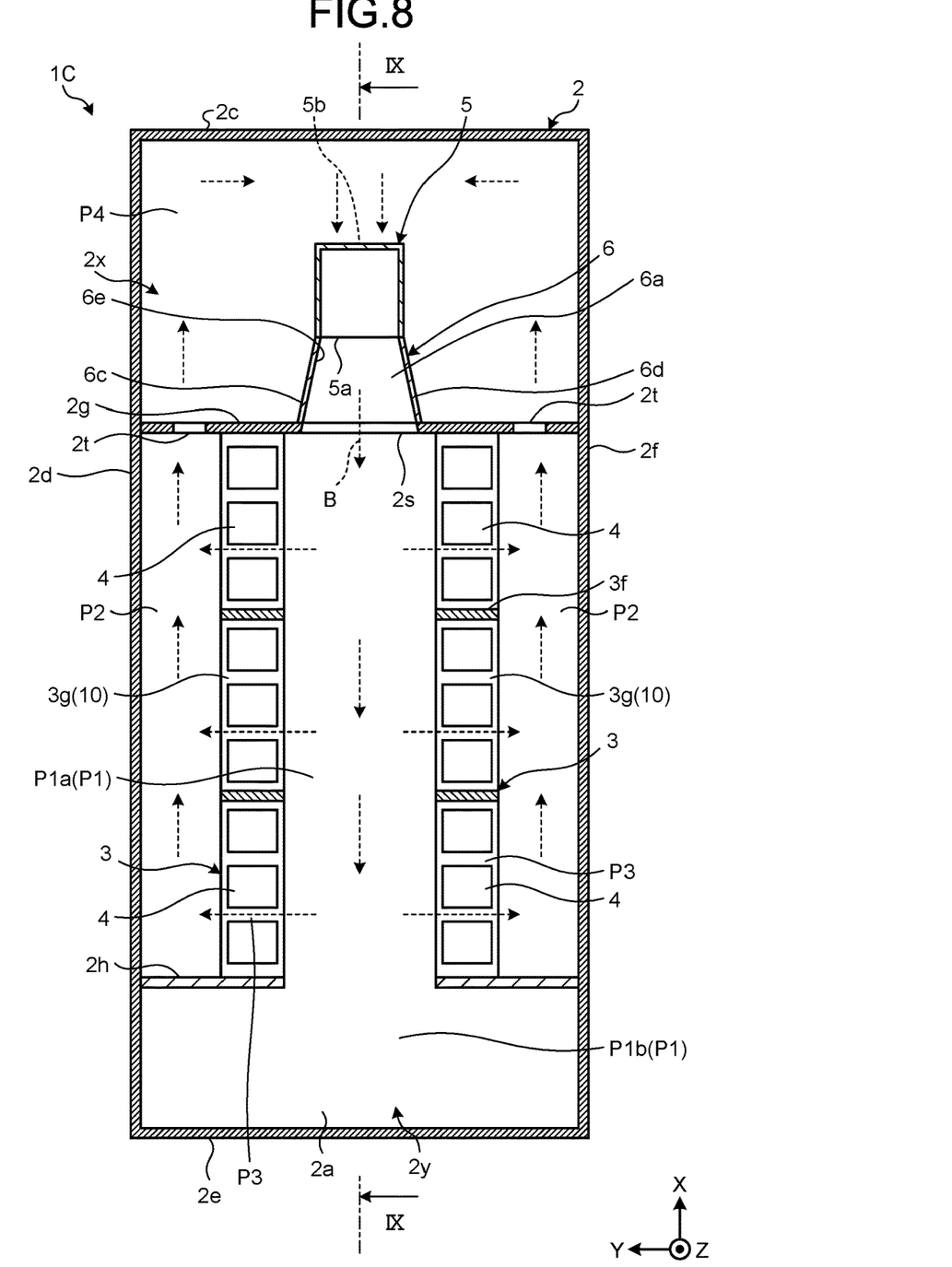
FIG. 8 is an exemplary and schematic sectional view of a storage battery system to which a cooling system according to a third modification is applied.
Figure 9:
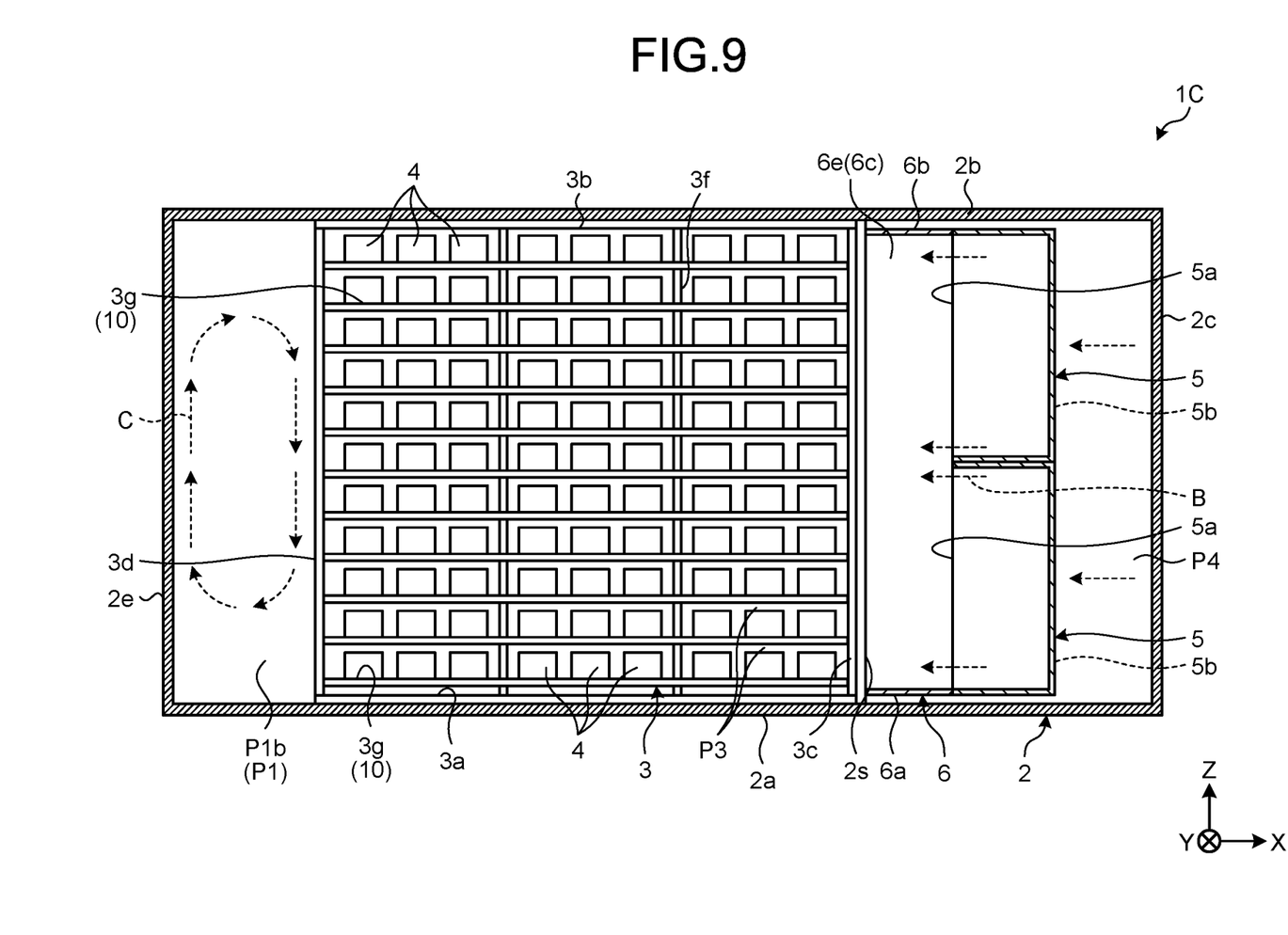
FIG. 9 is a sectional view taken along the IX-IX line in FIG. 8.

FIG. 8 is a sectional view of a storage battery system 1C according to a third modification. FIG. 9 is a sectional view taken along the IX-IX line in FIG. 8. The storage battery system 1C includes the similar configurations to the storage battery system 1 in the above embodiment. Therefore, the storage battery system 1C can produce the similar operation and advantages to the above embodiment based on those similar configurations.

However, the present modification is different from the above embodiment in that, for example, the inflow passage P1 includes a first part P1a and a second part P1b as illustrated in FIGS. 8 and 9. The inflow passage P1 is formed substantially in a T-shape with the first part P1a and the second part P1b as viewed in the Z direction.

The first part P1a is provided between the two housings 3 that are distanced from each other in the Y direction. The first part P1a spreads along the housings 3, that is, spreads in the X direction and the Z direction. In other words, the first part P1a is positioned to overlap in the Y direction with the housings 3, that is, the battery modules 4. The first part P1a is referred to as a base part.

The second part P1b is positioned at a side opposite to the inflow port 2s of the first part P1a without overlapping with the housings 3 in the Y direction, that is, positioned to shift in the opposite direction of the X direction. The second part P1b is provided between the left wall 2d and the right wall 2f of the container 2. The second part P1b spreads along the rear walls 2e of the container 2, that is, spreads in the Y direction and the Z direction. The second part P1b is referred to as an extended part.

In addition, partitioning walls 2h separating the second part P1b from the outflow passages P2 in the X direction are provided in the container 2. In other words, parts of the second part P1b are positioned to overlap with the outflow passages P2 in the X direction. The partitioning wall 2h is parallel with the partitioning wall 2g, and is positioned between the rear wall 2e and the partitioning wall 2g inside the container 2.

Inside the container 2, a circulating flow C (see FIG. 9) that circulates an axis extending in the Y direction is likely to be generated in a region near to the rear wall 2e for reasons such as variations in the Z direction among flow velocity of the cooling air B that flows through the inflow passage P1.

If such a circulating flow C is generated in, for example, the first part P1a, flow velocity of the cooling air B, which flows into the outflow passages P2 after passing through the housings 3 facing the circulating flow C in the Y direction, become smaller. In other words, air flow rates in regions facing the circulating flow C in the Y direction are then lower than those in the other regions, whereby cooling performance on the battery modules 4 arranged in the regions facing the circulating flow C is consequently lower.

In that point, according to the present modification, the circulating flow C is generated in the second part P1b in the inflow passage P1. As a result, a reduction in cooling performance of the circulating flow C on the battery modules 4 can be prevented. That is, the circulating flow C and the battery modules 4 are positioned to shift from each other in the X direction.

Therefore, for example, location-dependent differences in temperature among the battery modules 4 are easily reduced. Consequently, the life-span of the storage battery system 1C can be extended.

Fourth Modification

Figure 10:
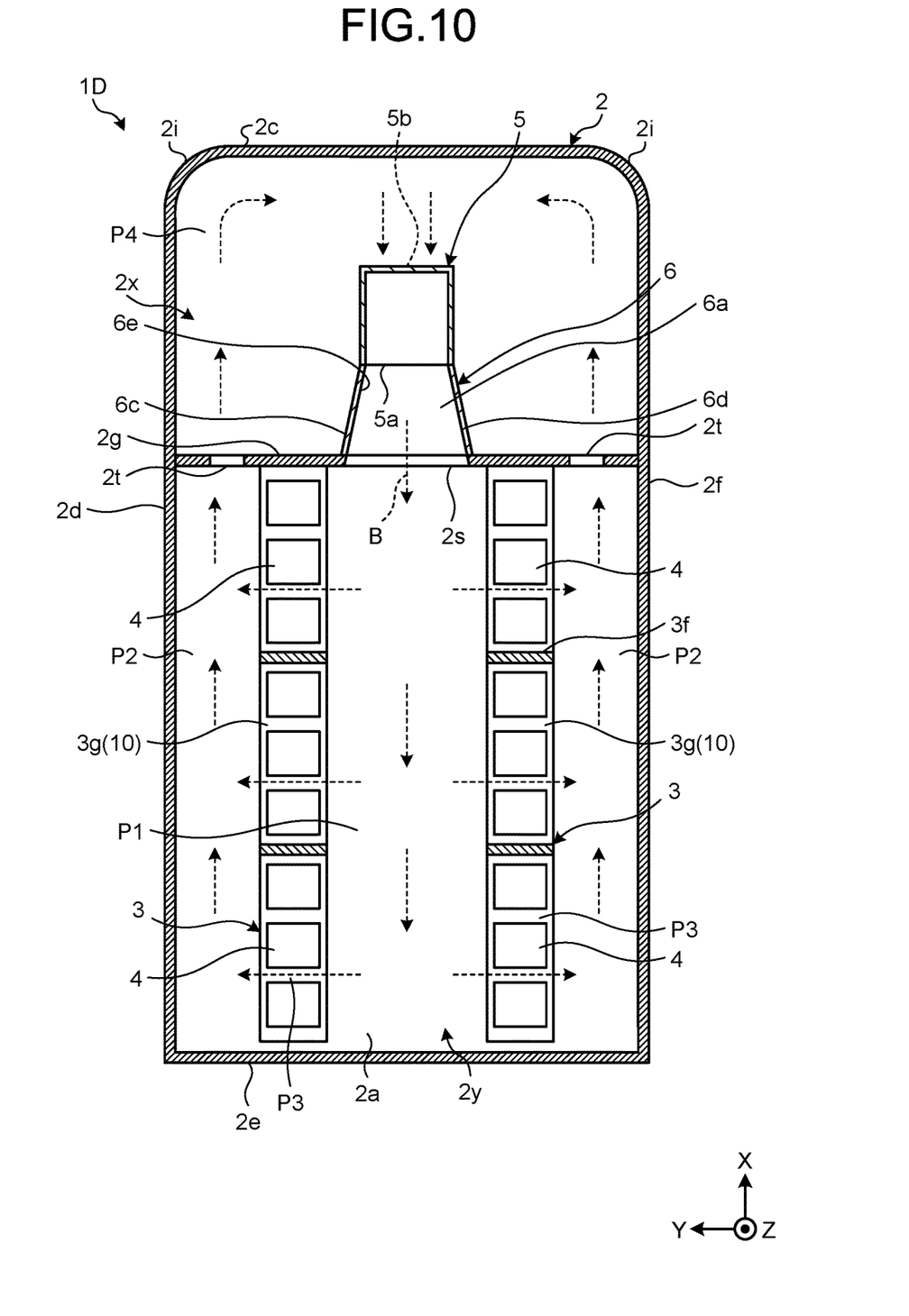
FIG. 10 is an exemplary and schematic sectional view of a storage battery system to which a cooling system according to a fourth modification is applied.

FIG. 10 is a sectional view of a storage battery system 1D according to a fourth modification. The storage battery system 1D includes the similar configurations to the storage battery system 1 in the above embodiment. Therefore, the storage battery system 1D can produce the similar operation and advantages to the above embodiment based on those similar configurations.

However, the present modification is different from the above embodiment in that, for example, curved-surface walls 2i are provided in the container 2 as illustrated in FIG. 10. The curved-surface walls 2i are provided between the front wall 2c and the left wall 2d of the container 2 and between the front wall 2c and the right wall 2f thereof. The front wall 2c is an example of a first side wall. The left wall 2d and the right wall 2f are examples of second side walls. The curved-surface wall 2i is an example of a third side wall.

The curved-surface walls 2i are each formed in, for example, an arc-shape whose center is located at the air conditioning device 5 disposed in a central portion of the air conditioning room 2x. In other words, the curved-surface walls 2i are convexly bent (curved), in directions going away from the air conditioning device 5, from two corner portions between the front wall 2c and the left wall 2d and between the front wall 2c and the right wall 2f.

Accordingly, in the present modification, in the air conditioning room 2x, the connecting passage P4 is provided, which is surrounded by the front wall 2c, the left wall 2d, the right wall 2f, and the curved-surface walls 2i and connects the outflow ports 2t to the inlet port 5b of the air conditioning device 5.

According to the configuration as described above, for example, the curved-surface walls 2i serve to reduce the ventilation resistance of the cooling air B that flows in the connecting passage P4 and consequently increase flow rates of the cooling air, thereby improving cooling performance on the battery modules 4.

In the present modification, although an example in which the third side walls are the curved-surface walls 2i is described above, this example is not limiting. For example, the third side wall may be a sloping wall (see an opening and closing door 21 in FIG. 11) intersecting (sloping with respect to) the front wall 2c and the left wall 2d (or the right wall 2f).

Fifth Modification

Figure 11:
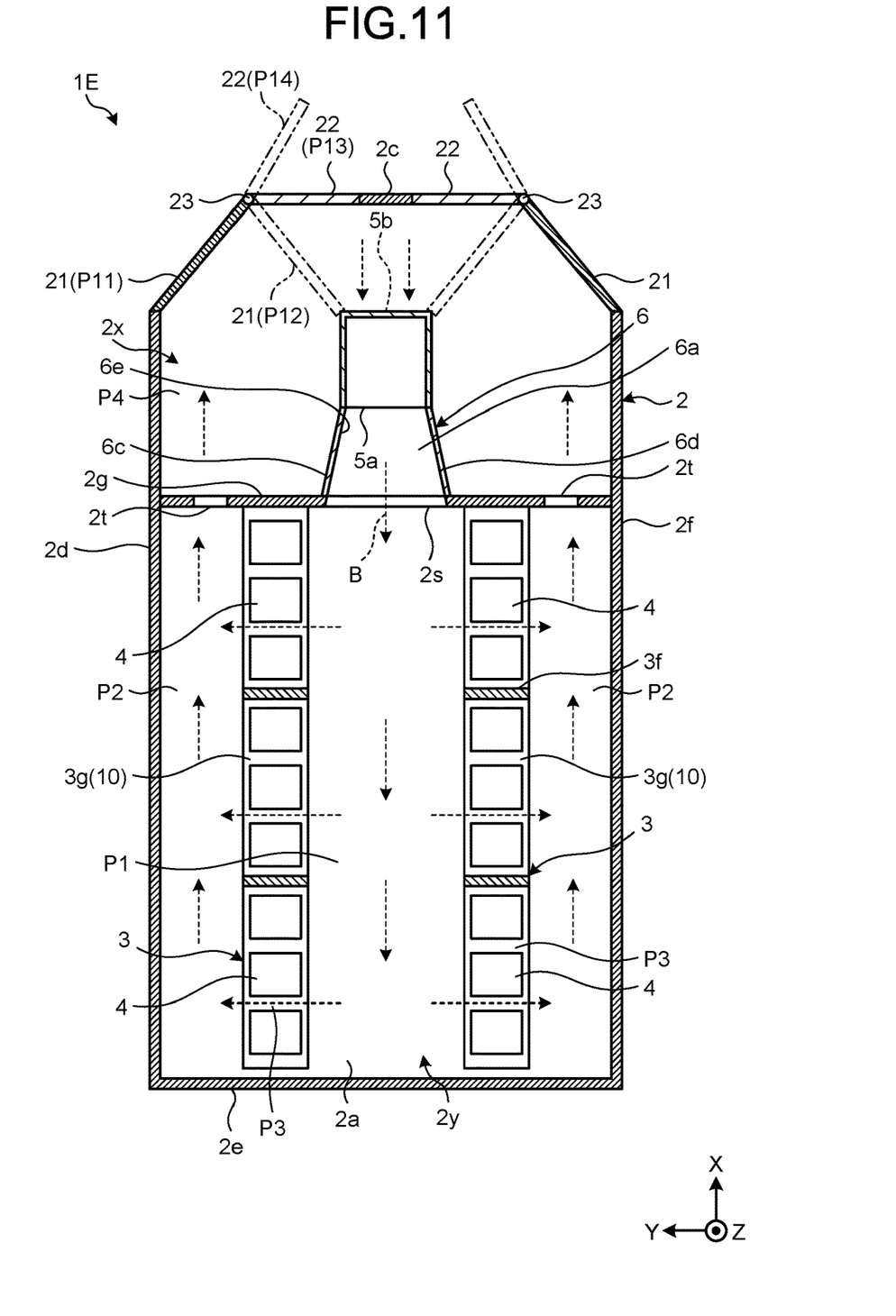
FIG. 11 is an exemplary and schematic sectional view of a storage battery system to which a cooling system according to a fifth modification is applied.

FIG. 11 is a sectional view of a storage battery system 1E according to a fifth modification. The storage battery system 1E includes the similar configurations to the storage battery system 1D in the above fourth modification. Therefore, the storage battery system 1E can produce the similar operation and advantages to the above embodiment based on those similar configurations.

However, the present modification is different from the above fourth modification in that, for example, opening and closing doors 21 and 22 are provided in the container 2 as illustrated in FIG. 11. The opening and closing doors 21 and 22 are provided between the front wall 2c and the left wall 2d of the container 2 and between the front wall 2c and the right wall 2f, respectively. The opening and closing doors 21 and 22 are examples of the third side walls.

In the present modification, the opening and closing doors 21 and 22 are provided to be switchable between a communicating state and a non-communicating state, the communicating state being a state where the connecting passage P4 and space outside the container 2 are interconnected with each other, the non-communicating state being a state described above.

Specifically, the opening and closing door 21 is supported in a rotatable manner by the container 2 through a hinge 23 having a rotational axis extending in the Z direction. The opening and closing door 21 rotates about the rotational axis of the hinge 23, thereby being able to move between a closing position P11 at which the connecting passage P4 is closed and an opening position P12 at which the connecting passage P4 is opened. The same applies to the opening and closing door 22, which is positioned in a location that is shifted from the opening and closing door 21 toward the center in the Y direction. While the closing positions P11 and P13 are an example of the non-communicating state, the opening positions P12 and P14 are an example of the communicating state.

According to the present modification, switching between the communicating state and the non-communicating state by the opening and closing doors 21 and 22 enables, for example, selection between an outside air mode where the battery modules 4 are cooled with outside air of the container 2 and an air conditioning mode where the battery modules 4 are cooled with the flow of cooling air having a low temperature by the air conditioning device 5 inside the container 2.

As a result, the present modification has the advantage that, for example, the battery modules 4 can be cooled in a low load state where only the fan of the air conditioning device 5 is operated with the outside air mode under the condition that the outside air has a sufficiently low temperature.

While the embodiment and modifications according to the present invention are above described as examples, the above embodiment and modifications are merely examples and are not intended to limit the scope of the invention. The above embodiment and modifications can be implemented in various other forms; and various omissions, substitutions, combinations, and changes can be made thereto without departing from the gist of the invention. Furthermore, the above embodiment and modifications can be implemented with appropriate changes made to the specifications (such as structures, kinds, directions, formats, sizes, lengths, widths, thicknesses, heights, numbers, arrangement, positions, and materials) of the configurations and the shapes.

The invention claimed is:

1. A cooling system comprising:
   a container that includes
      an inflow passage extending in a first direction,
      an outflow passage positioned in a second direction intersecting the first direction of the inflow passage, the outflow passage extending in the first direction,
      an inflow port through which cooling air from an air conditioning device flows in, the inflow port being interconnected with the inflow passage, and
      an outflow port through which the cooling air flows out, the outflow port being interconnected with the outflow passage;
   a housing that includes shelf portions arranged between the inflow passage and the outflow passage, the shelf portions containing heat-generating modules, the housing including intermediary passages extending between the inflow passage and the outflow passage across the shelf portions; and
   a duct that connects the inflow port and an outlet port of the air conditioning device, the duct including a sloping face facing the cooling air and sloping in the second direction as the sloping face approaches the inflow port from the air conditioning device.

2. The cooling system according to claim 1, wherein an opening width of the inflow port in the second direction is larger than a width of the inflow passage in the second direction.

3. The cooling system according to claim 2, wherein a width of the duct in the first direction is larger than an opening width of the inflow port in the second direction.

4. The cooling system according to claim 2, wherein the inflow passage includes a first part and a second part, the first part being positioned to overlap with the housing in the second direction, the second part being positioned at a side opposite to the inflow part of the first part without overlapping with the housing in the second direction.

5. The cooling system according to claim 2, wherein the container includes
   a first side wall,
   a second side wall intersecting the first side wall,
   a third side wall extending between the first side wall and the second side wall, the third side wall being bent or sloping, and
   a connecting passage surrounded by the first side wall, the second side wall, and the third side wall, the connecting passage connecting the outflow port and an inlet port of the air conditioning device.

6. The cooling system according to claim 1, wherein a width of the duct in the first direction is larger than an opening width of the inflow port in the second direction.

7. The cooling system according to claim 6, wherein the inflow passage includes a first part and a second part, the first part being positioned to overlap with the housing in the second direction, the second part being positioned at a side opposite to the inflow part of the first part without overlapping with the housing in the second direction.

8. The cooling system according to claim 6, wherein the container includes
   a first side wall,
   a second side wall intersecting the first side wall,
   a third side wall extending between the first side wall and the second side wall, the third side wall being bent or sloping, and
   a connecting passage surrounded by the first side wall, the second side wall, and the third side wall, the connecting passage connecting the outflow port and an inlet port of the air conditioning device.

9. The cooling system according to claim 1, wherein the inflow passage includes a first part and a second part, the first part being positioned to overlap with the housing in the second direction, the second part being positioned at a side opposite to the inflow part of the first part without overlapping with the housing in the second direction.

10. The cooling system according to claim 9, wherein a part of the second part is positioned to overlap with the outflow passage in the first direction.

11. The cooling system according to claim 10, wherein the container includes
    a first side wall,
    a second side wall intersecting the first side wall,
    a third side wall extending between the first side wall and the second side wall, the third side wall being bent or sloping, and
    a connecting passage surrounded by the first side wall, the second side wall, and the third side wall, the connecting passage connecting the outflow port and an inlet port of the air conditioning device.

12. The cooling system according to claim 9, wherein the container includes
    a first side wall,
    a second side wall intersecting the first side wall,
    a third side wall extending between the first side wall and the second side wall, the third side wall being bent or sloping, and
    a connecting passage surrounded by the first side wall, the second side wall, and the third side wall, the connecting passage connecting the outflow port and an inlet port of the air conditioning device.

13. The cooling system according to claim 1, wherein the container includes
    a first side wall,
    a second side wall intersecting the first side wall,
    a third side wall extending between the first side wall and the second side wall, the third side wall being bent or sloping, and
    a connecting passage surrounded by the first side wall, the second side wall, and the third side wall, the connecting passage connecting the outflow port and an inlet port of the air conditioning device.

14. The cooling system according to claim 13, wherein the container includes an opening and closing door being provided to be switchable between a communicating state and a non-communicating state, the communicating state being a state where the connecting passage and outside of the container are interconnected with each other.

\* \* \* \* \*